United States Patent
Fisher

(10) Patent No.: US 10,100,911 B2
(45) Date of Patent: Oct. 16, 2018

(54) MODULAR CROSS SHAFT YOKE

(71) Applicant: Eaton Corporation, Cleveland, OH (US)

(72) Inventor: Daniel Philip Fisher, Coldwater, MI (US)

(73) Assignee: Eaton Intelligent Power Limited, Dublin (IE)

( * ) Notice: Subject to any disclaimer, the term of this patent is extended or adjusted under 35 U.S.C. 154(b) by 171 days.

(21) Appl. No.: 15/081,844

(22) Filed: Mar. 26, 2016

(65) Prior Publication Data

US 2016/0208899 A1 Jul. 21, 2016

Related U.S. Application Data

(63) Continuation-in-part of application No. 14/342,681, filed as application No. PCT/US2012/053823 on Sep. 6, 2012, now Pat. No. 9,303,750.

(60) Provisional application No. 61/531,458, filed on Sep. 6, 2011.

(51) Int. Cl.
*F16H 48/08* (2006.01)
*F16H 48/40* (2012.01)
*F16H 48/38* (2012.01)

(52) U.S. Cl.
CPC ....... *F16H 48/38* (2013.01); *F16H 2048/085* (2013.01); *F16H 2048/382* (2013.01)

(58) Field of Classification Search
CPC .................. F16H 48/08; F16H 48/40
See application file for complete search history.

(56) References Cited

U.S. PATENT DOCUMENTS

| | | |
|---|---|---|
| 696,704 A | 4/1902 | Allen |
| 1,874,646 A | 8/1932 | Skinner |
| 2,529,392 A | 11/1950 | Herreshoff |
| 3,323,388 A | 6/1967 | Snoy et al. |

(Continued)

FOREIGN PATENT DOCUMENTS

| | | |
|---|---|---|
| EP | 0471499 A1 | 2/1992 |
| JP | 0650396 A | 2/1994 |

(Continued)

OTHER PUBLICATIONS

International Search Report and Written Opinion of the International Searching Authority (ISA/220, ISA/210, ISA/237) PCT/US2012/053823, dated Nov. 5, 2012, pp. 1-11.

(Continued)

*Primary Examiner* — Tisha D Lewis
(74) *Attorney, Agent, or Firm* — Mei & Mark, LLP

(57) ABSTRACT

A mounting system for a differential comprises a cross shaft. The cross shaft comprises a passageway through the cross shaft perpendicular to a long axis. The passageway comprises a first hole and a second hole. A recess comprising a planar wall is proximal to the first hole. A first stub shaft comprises a planar surface in contact with the planar wall. A second stub shaft is proximal the second hole. A yoke in the passageway comprises a first portion extending in to the first stub shaft and a second portion extending in to the second stub shaft. A first bang ring is on the first portion of the yoke, and a second bang ring is on the second portion of the yoke. The yoke slip fits to the first stub shaft and the yoke slip fits to the second stub shaft.

22 Claims, 7 Drawing Sheets

(56) References Cited

U.S. PATENT DOCUMENTS

| | | | |
|---|---|---|---|
| 3,593,595 | A | 7/1971 | Taylor |
| 3,651,713 | A | 3/1972 | Mueller |
| 3,894,447 | A | 7/1975 | Michael |
| 3,974,717 | A | 8/1976 | Breed et al. |
| 4,182,201 | A | 1/1980 | Mayhew et al. |
| 4,867,010 | A | 9/1989 | Stettler, Jr. |
| 5,186,694 | A | 2/1993 | Cooper |
| 5,647,814 | A | 7/1997 | Krisher |
| 7,025,702 | B2 | 4/2006 | Saito et al. |
| 7,081,065 | B2 | 7/2006 | Sudou |
| 9,303,750 | B2 * | 4/2016 | Fisher .................... F16H 48/08 |
| 2002/0183157 | A1 | 12/2002 | Ballinger et al. |
| 2008/0032847 | A1 | 2/2008 | Chludek et al. |
| 2010/0130325 | A1 | 5/2010 | Gutmann |

FOREIGN PATENT DOCUMENTS

| | | |
|---|---|---|
| JP | 11-002311 A | 1/1999 |
| JP | 2010-526262 A | 7/2010 |
| WO | 2008135102 A1 | 11/2008 |

OTHER PUBLICATIONS

International Preliminary Report on Patentability (IB/373, ISA/237) PCT/US2012/053823, dated Mar. 12, 2014, pp. 1-8.

\* cited by examiner

MODULAR CROSS SHAFT YOKE

PRIORITY

This application is a continuation-in-part of U.S. patent application Ser. No. 14/342,681 filed Mar. 4, 2014, which is a § 371 National Stage Entry of International Application No. PCT/US2012/053823 filed Sep. 6, 2012, which claims the benefit of priority of U.S. provisional patent application No. 61/531,458, filed Sep. 6, 2011. The content of these applications are incorporated herein by reference in their entirety.

FIELD

The disclosure relates generally to vehicle differentials having four pinions in a one-piece housing. More specifically, the disclosure relates to a cross shaft and stub shafts with a yoke and self-locking features for use in assembling a differential.

BACKGROUND

Vehicle differentials include gearing to allow the wheels of the vehicle to rotate differently for purposes such as anti-slip, traction control, oversteer, and understeer. One portion of the differential may house pinion gears on one or more shafts. The pinion gears can thereby maintain a location relative to cooperating side gears.

Some differentials may comprise four pinions. Some differentials of this type have required that the housing surrounding four inner pinions be split down the middle in order to mount the pinion shafts. One example having this design overlaps cross shafts with central notches. The machining requirements are high because the housing must mate along a plane, the cross shaft notches must mate, and the housing is typically modified on one or both halves to receive the cross shafts. The design is also bulky and heavy because the housing must have means to lock the halves together.

Other designs for four pinion differentials have a one-piece housing and some combination of stub shafts and cross shaft. The machining requirements are also high for these prior art stub shaft designs because of the use of threaded fasteners in addition to machining for alignment of the stubs and cross shaft. The design may also include retaining plates, thereby increasing the number of toleranced parts. The designs are bulky and heavy because the threaded areas require additional materials for rigidity and the housing requires sufficient means to accept the retaining plates and or threaded members.

SUMMARY

A mounting system for a differential comprises a cross shaft. The cross shaft comprises a passageway through the cross shaft perpendicular to a long axis. The passageway comprises a first hole and a second hole. A recess comprising a planar wall is proximal to the first hole. A first stub shaft comprises a long axis parallel to a central axis of the first hole, the first stub shaft comprises a planar surface in contact with the planar wall. A second stub shaft comprises a long axis parallel to a central axis of the second hole. A yoke in the passageway comprises a first portion extending in to the first stub shaft and a second portion extending in to the second stub shaft. A first bang ring is on the first portion of the yoke, and a second bang ring is on the second portion of the yoke. The yoke slip fits to the first stub shaft and the yoke slip fits to the second stub shaft.

A differential assembly comprises a housing, the housing comprises and substantially encloses components of a differential assembly. A first, second, third, and fourth pinion gear are within the housing. A cross shaft passes through the first and fourth pinion gears. A first stub shaft passes through the second pinion gear. A second stub shaft passes through the third pinion gear. A yoke passes through portions of the cross shaft, the first stub shaft, and the second stub shaft. A first fitting connects the yoke to the first stub shaft and a second fitting connects the yoke to the second stub shaft. The yoke slip fits to the first stub shaft and the yoke slip fits to the second stub shaft to retain the cross shaft, the first stub shaft, and the second stub shaft within the housing.

A method for assembling pinion shafts in a differential housing comprises the steps of inserting a cross shaft in to a first opening in the housing and extending the cross shaft through the housing to a second opening in the housing. A yoke is inserted in to a first stub shaft. A second stub shaft is inserted in to a third opening in the housing. The second stub shaft is extended in to abutment with the cross shaft. The first stub shaft is inserted in to a fourth opening in the housing. The first stub shaft is extended in to abutment with the cross shaft to press-fit the first stub shaft to the cross shaft. The yoke passes through cross shaft openings, and the yoke slip-fits to the second stub shaft.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only.

DETAILED DESCRIPTION

Reference will now be made in detail to the examples which are illustrated in the accompanying drawings. Wherever possible, the same reference numbers will be used throughout the drawings to refer to the same or like parts.

Figure 1:
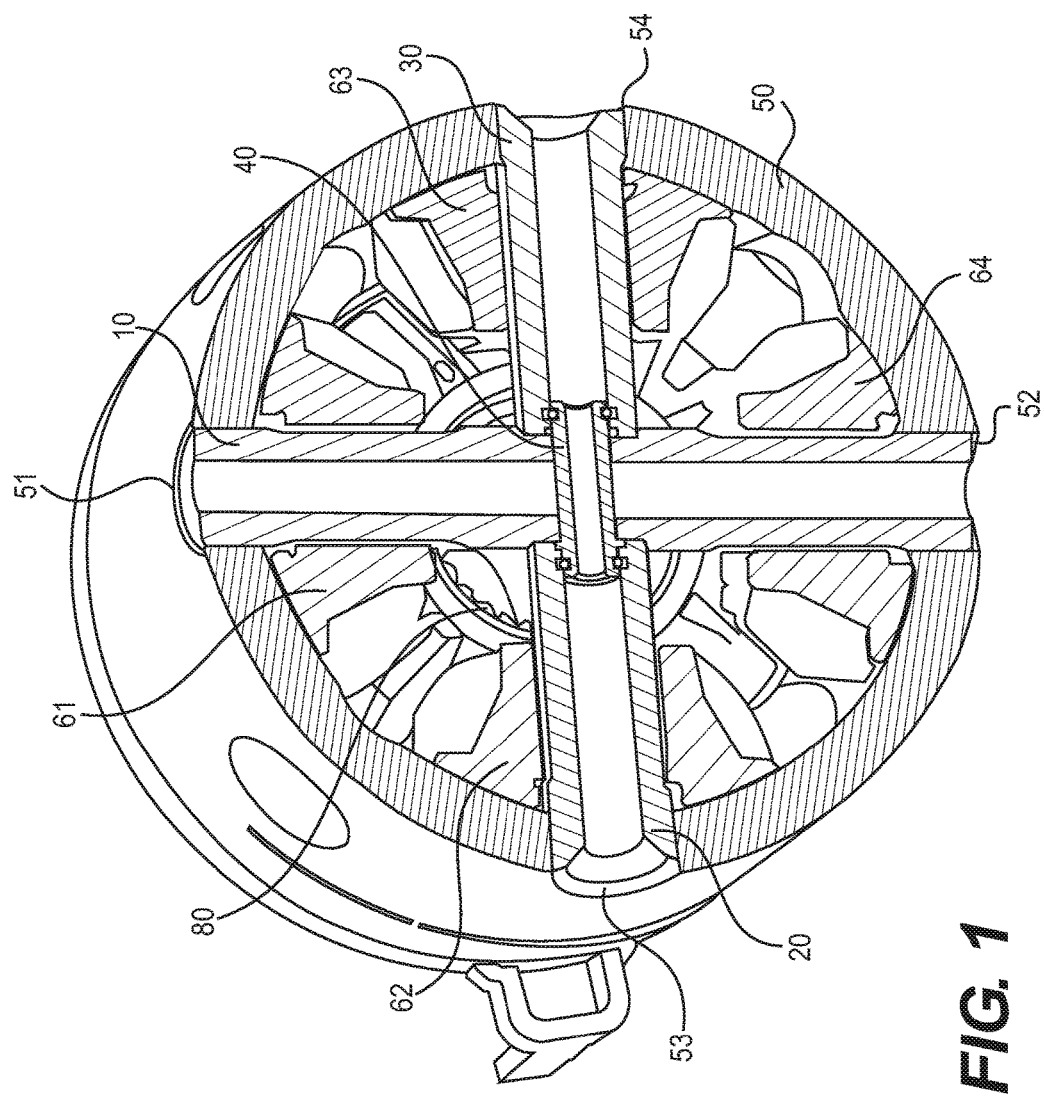
FIG. 1 is cross section of a housing for pinions of a differential.

FIG. 1 shows a cross section of a one-piece pinion housing 50 for a differential. That is, the housing 50 is shown halved, but is in fact a single sleeve that does not require mating with another half to complete the housing. FIG. 1 also shows a side gear 80 cooperating with first, second, third, and fourth pinion gears 61, 62, 63, and 64.

The housing 50 has first, second, third, and fourth housing openings 51, 52, 53, and 54 for accommodating the insertion of a cross shaft 10, first stub shaft 20, and second stub shaft 30. First and second housing openings 51 and 52 are coaxial, and third and fourth housing openings 53 and 54 are coaxial. Cross shaft 10 passes through first and fourth pinions 61 and 64, and the cross shaft 10 is retained, in part, within the first and second housing openings 51 and 52. For example, during drop-in assembly, cross shaft 10 can slide through first housing opening 51 and press fit or slip fit in to second housing opening 52. First stub shaft 20 passes through second pinion 62 and is retained, in part, in third housing opening 53. Second stub 30 shaft passes through third pinion 63 and is retained, in part, in fourth housing opening 54. Cylindrical portions 27, 37 of first stub shaft and second stub shaft can include a taper or raised outer diameter to snugly seat in the respective third and fourth housing openings 53, 54.

A mounting system for the pinions of the differential may comprise yoke 40, cross shaft 10, first stub shaft 20, and second stub shaft 30. Yoke 40 connects to first stub shaft 20, passes through the cross shaft 10, and connects to the second stub shaft 30, which can be seen in more detail in FIGS. 2A, 2B, and 3.

Yoke 40 may comprise a circumferential lip 41. The lip 41 provides a positive stop for assembly and disassembly purposes. The lip 41 may press fit in to a recess 21 in the first stub shaft 20 so as to secure the yoke 40 to the first stub shaft 20. An additional or alternative fitting may comprise a circumferential groove 22 in the first stub shaft and a circumferential notch 42 in the yoke 40. A fitting 70, such as a snap ring or bang ring, may be placed in the notch 42. Yoke 40, notch 42, and fitting 70 may be slid in to the first stub shaft 20 until the fitting 70 mates with the groove 22. Tooling can seat in orientation notch 47 to stabilize the yoke 40 during coupling activities. The press fit lip 41 may be used alone or together with the fitting 70 to secure the yoke 40 with the first stub shaft 20. It may also be desirable to use the fitting 70 alone without the lip 41 press fitting.

Figure 2A:
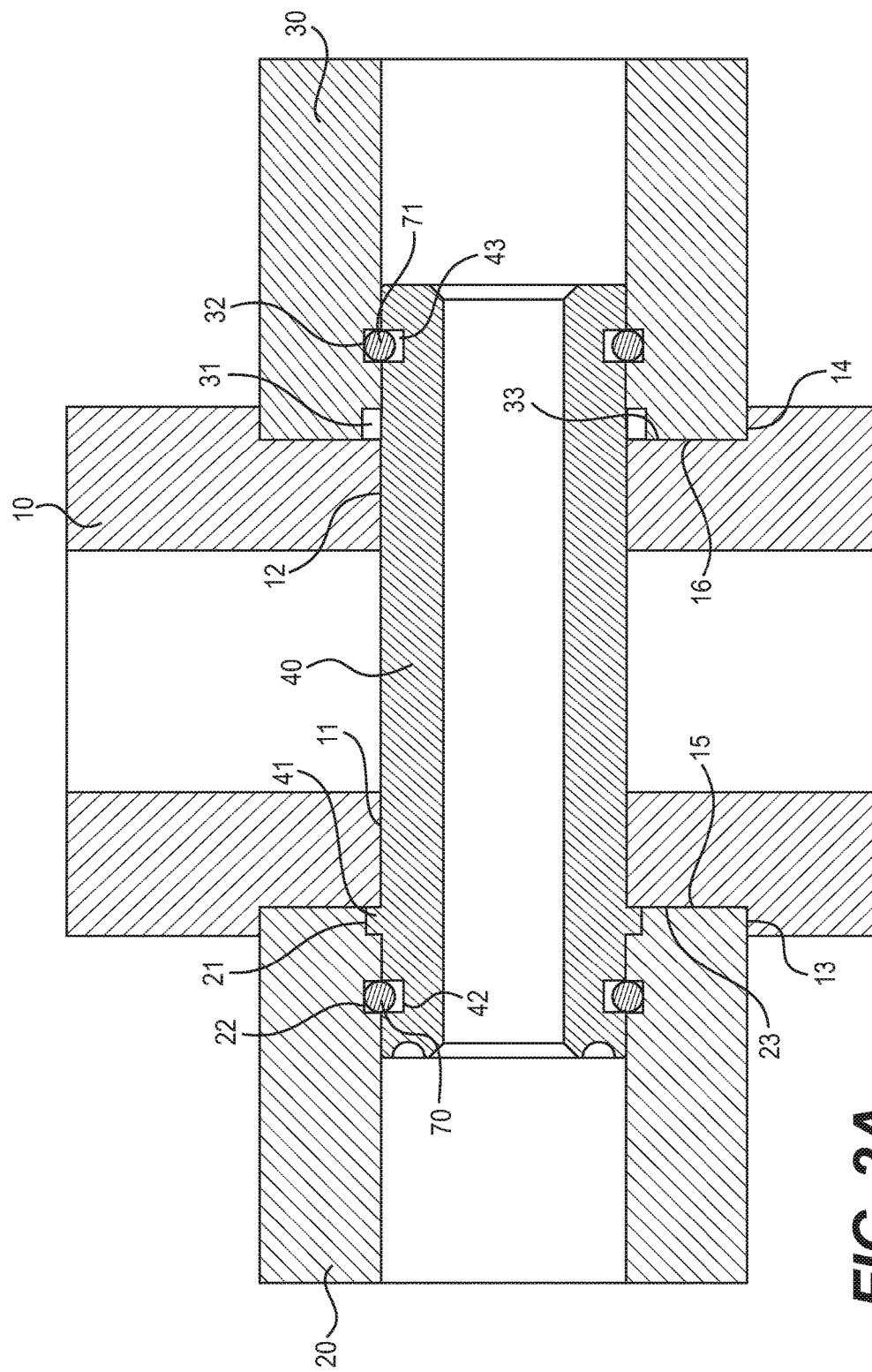
FIGS. 2A & 2B are cross sections of a portion of the pinion mounting system.

Yoke 40 also comprises a second notch 43 for receiving a second fitting 71. Yoke 40, second notch 42 and fitting 71 may be slip fitted in to second stub shaft 30 by sliding in to the second stub shaft 30 until the fitting 71 seats in second groove 32. FIG. 2A illustrates a second recess 31 in the second stub shaft 30. The second recess 31 is optional for the coupling method shown in FIG. 2A. The first stub shaft 20 may be identical to the second stub shaft 30 so that the same stock part may be used during assembly.

Figure 2B:
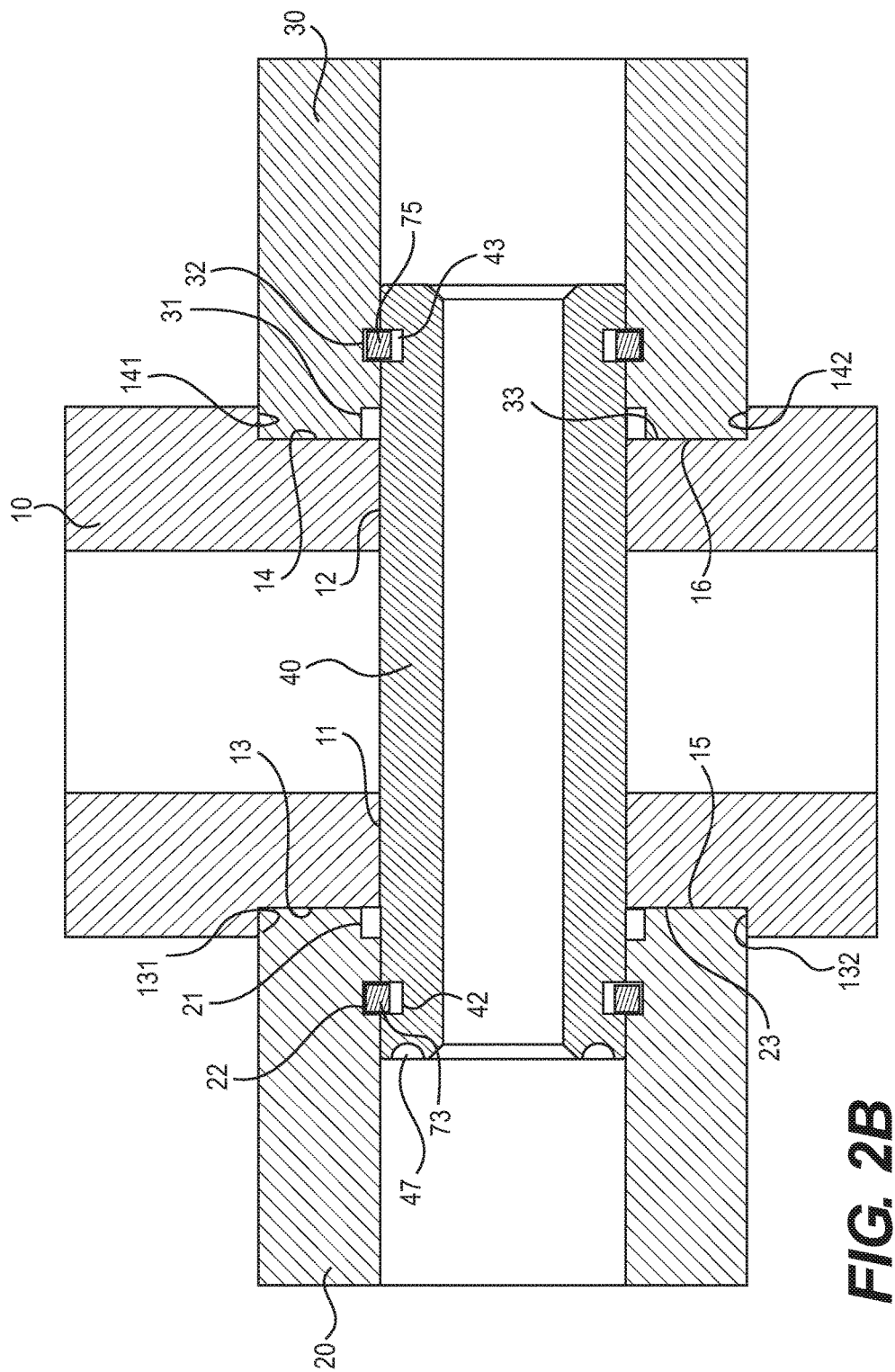

The fittings 70 & 71 can be round, as shown in FIG. 2A, or the fittings can be squared-off, as shown in FIG. 2B. In FIG. 2B, the fittings are squared-off bang rings 73, 75. Bang ring 73 couples in groove 22 and notch 42 to secure the yoke 40 to first stub shaft 20. Bang ring 75 couples in groove 32 and notch 43 to secure the yoke 40 to the second stub shaft 30. No lips are used, so recesses 21 and 31 are empty. Recesses 21 and 31 can also be omitted in this variation. Bang rings 73, 75 have a different profile than rings 70, 71. The yoke 40 slip fits to both first and second stub shafts 20, 30. To further support the stability of the coupling, the stub shafts 20, 30 can press-fit to the cross shaft 10.

Figure 4A:
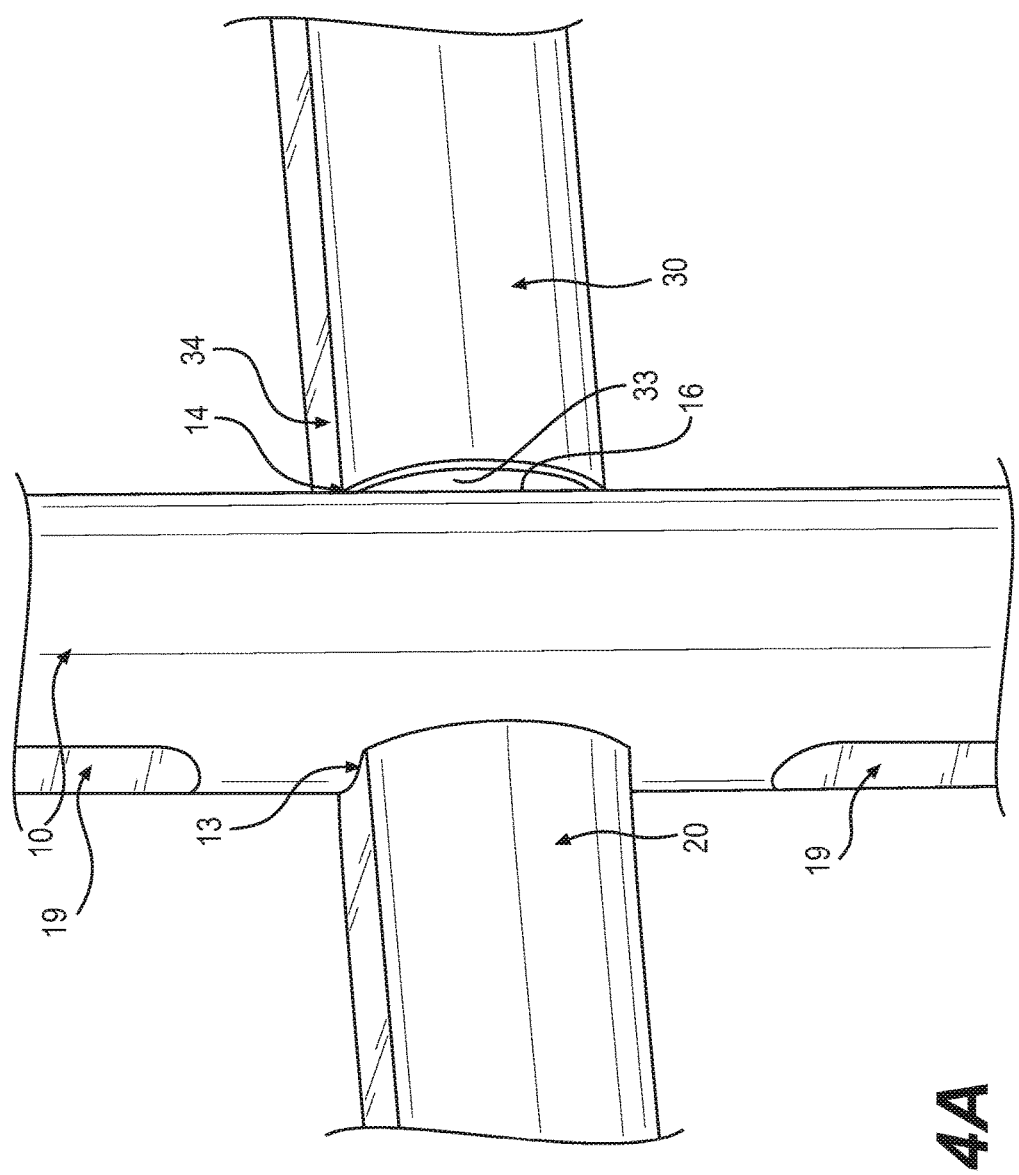
FIGS. 4A & 4B are alternative views of the pinion mounting system.
Figure 4B:
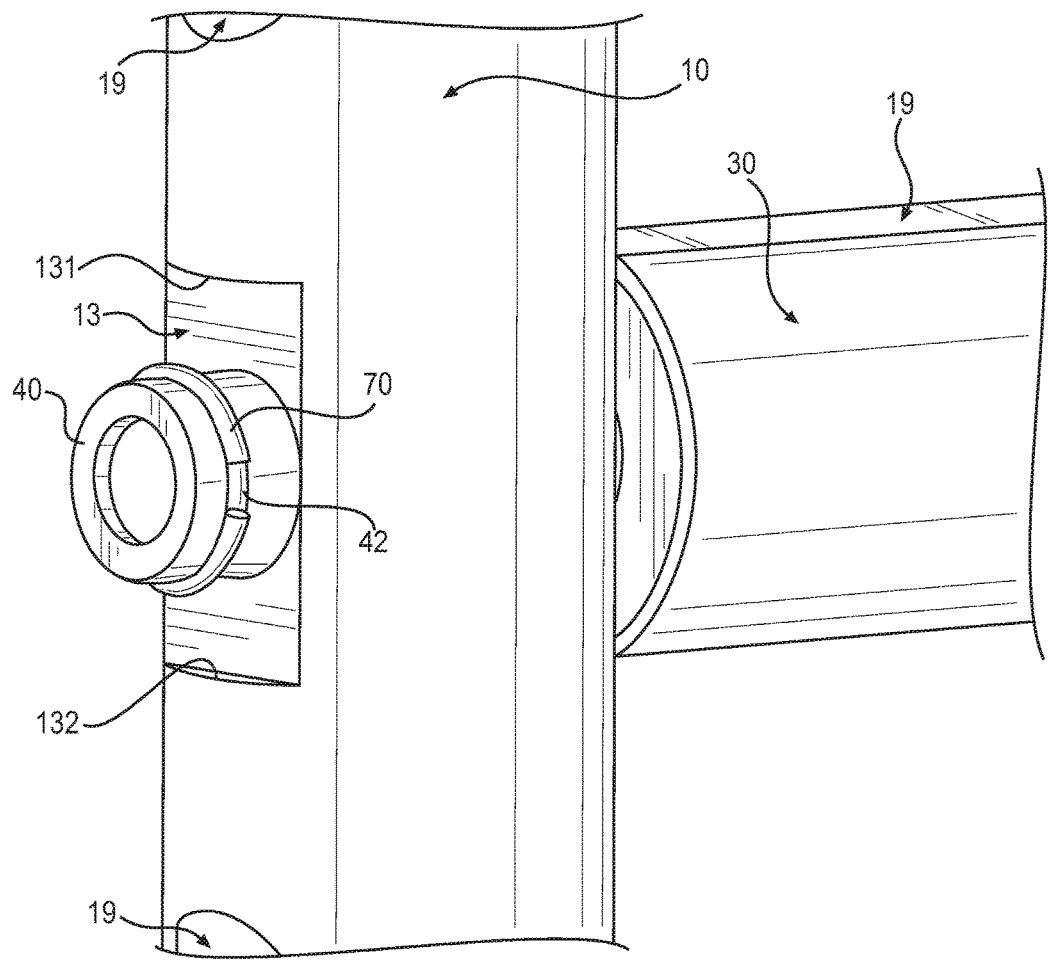

When no lip 41 is used to press-fit to a stub shaft, the stub shaft is prone to rotate with respect to the yoke. Anti-rotation features can be included to suppress rotation of the cross shaft 10 and stub shafts 20, 30. For example, machining a flat in cross shaft 10 can create recess 13, as shown in FIG. 4B, with planar walls 131, 132. Planar surfaces 24, 34 mate to respective planar walls 131, 132. This locks the stub shafts from rotating with respect to the cross shaft, and vice versa. The anti-rotation features can be used with any of the disclosed yoke coupling techniques. In FIG. 4B, the first stub shaft 20 is not shown, but the yoke 40 and fitting 70 are shown with respect to the recess 13. Lip 41 is not used in the example of FIG. 4B, though it can augment the coupling of the stub shaft 20 to the cross shaft 10.

First stub shaft 20 has a long axis parallel to the long axis of the yoke 40, which is parallel to the long axis of the second stub shaft 30. These three axes are perpendicular to the long axis of the cross shaft 10. Cross shaft 10 has two openings 11 and 12 forming a passageway for a portion of yoke 40 to pass through. Cross shaft 10 also has two recesses 13 and 14 in the outer wall. The recesses 13 and 14 may be proximal with the openings 11 and 12, and rounded portions of the recess may be in concentric proximity with the openings 11 and 12. Each recess has at least one planar face 15 and 16. A flat end 23 of the first stub shaft 20 may abut planar face 15. A portion of the outer surface of the first stub shaft may abut the interior of the recess 13. Similarly, flat end 33 of the second stub shaft 30 may abut planar face 16. The flat end 33 can overhang the planar face 16, as shown in FIG. 4A. A portion of the outer surface of the second stub shaft may abut the interior of the recess 14. The recesses 13 and 14 may comprise anti-rotation features, such as one or more planar walls 131, 132, for mating with complementary features, such as planar surfaces 24, 34 on the stub shafts. A single planar surface can be used with a single planar wall, but parallel planar walls with parallel planar surfaces can also be used.

Figure 3:
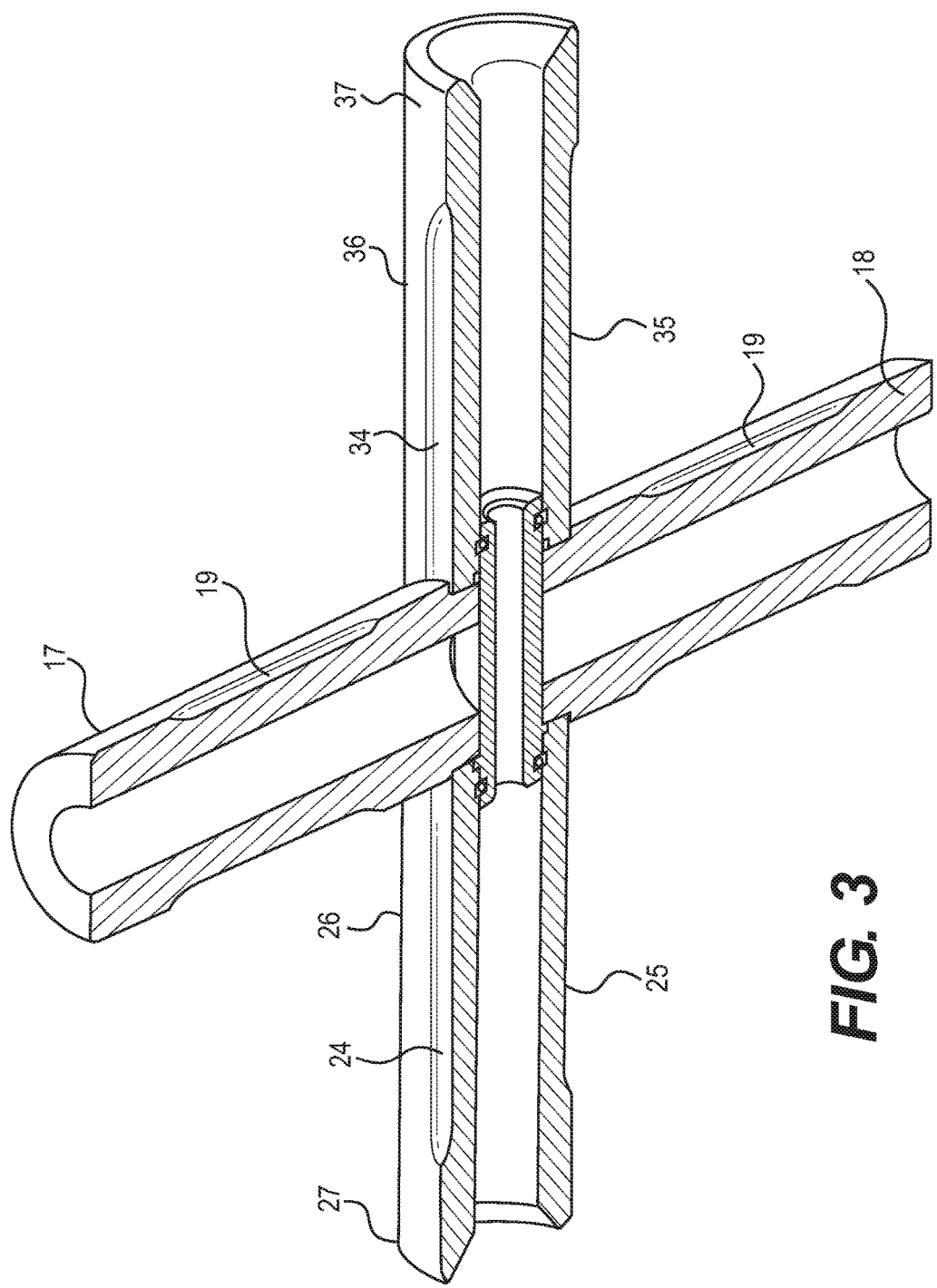
FIG. 3 is a perspective view of the pinion mounting system.

FIG. 3 is a perspective view of the mounting assembly, and FIGS. 4A and 4B are section views including anti-rotation features. Anti-rotation features may include at least one inner side wall of the recess 13 being planar, and at least one inner side wall of the recess 14 being planar. FIG. 4B shows two planar side walls 131, 132, which can be formed by machining flats in the cross shaft. The planar surfaces 24, 25 of stub shaft 20 can press-fit to the side walls 131, 132. Mirror formations, such as side walls 141, 142 can be formed for receiving stub shaft 30. FIGS. 3, 4A and 4B show two planar side walls of recess 13 abutting two portions of first stub shaft 20 with planar surfaces 24 and 25. Two planar side walls of recess 14 abut two portions of second stub shaft 30 with planar surfaces 34 and 35. The first and second stub shafts 20 and 30 may comprise portions with planar surfaces 24, 25, 34, 35 connected by respective rounded surfaces 26 and 36. As shown in FIG. 4B, the rounded surfaces 26, 36 can protrude out from the profile of the cross-shaft. The planar surfaces 24, 25, 34, and 35 can lock the stub shafts 20 and 30 from rotating with respect to the cross shaft 10 when the cross shaft 10 includes complementary flat surfaces, such as planar side walls 131, 132 in the recesses 13 and 14. Other lock and key patterns of flat surfaces may be used, such as triangle, square, pentagon, hexagon, etc., with our without intervening rounded surfaces. The anti-rotation features can be used with or without a press-fit between the stub shafts 20, 30 and the cross shaft 10. A press-fit between the stub shafts and cross shaft would eliminate play, but omitting this press-fit reduces manufacturing tolerance. Tradeoffs can permit selection of one or both stub shafts having play or press-fit to the cross shaft.

To maintain balance of weight in the mounting system, the cross shaft 10 has diameter changes, illustrated as flat surfaces 19. The flat surfaces 19 can complement the flat surfaces of the stub shafts so that, as the differential rotates in use, the rotational forces are balanced to prevent differential failure at the mounting system. The flat surfaces 24, 25, 34, 35, and 19 reduce the overall weight of the mounting system and reduce the amount of material needed to form the parts.

Respective cylindrical portions 17, 18, 27, and 37 on the cross shaft 10, first stub shaft 20, and third stub shaft 30 fit in to respective first, second, third, and fourth housing openings 51, 52, 53, and 54. The cylindrical portions and openings may be toleranced or tapered for a snug fit once the parts are correctly located. As one example, cylindrical portion 18 can slide through first housing opening 51 and pass through the pinion housing 50 to second housing opening 52. A portion of the inner diameter of second housing opening 52 can be dimensioned to snugly receive a portion of cylindrical portion 18, as by press-fitting to an outer diameter of the cylindrical portion 18. Cylindrical portion 17 can include a tapered area to seat snugly against an inner diameter of first housing opening 51.

The edges of the recesses 21 and 31 may be chamfered to allow the fittings 70 and 71 or 73 and 75 to slide past the recesses to the grooves 22 and 32. The grooves 22 and 32 and notches 42 and 43 are not chamfered, so that the fittings cannot recompress to slide out of the assembly. The cross shaft 10 may include additional chamfering at ends of openings 11 and 12 so that the fittings may be compressed to pass through the cross-shaft 10.

Figure 5:
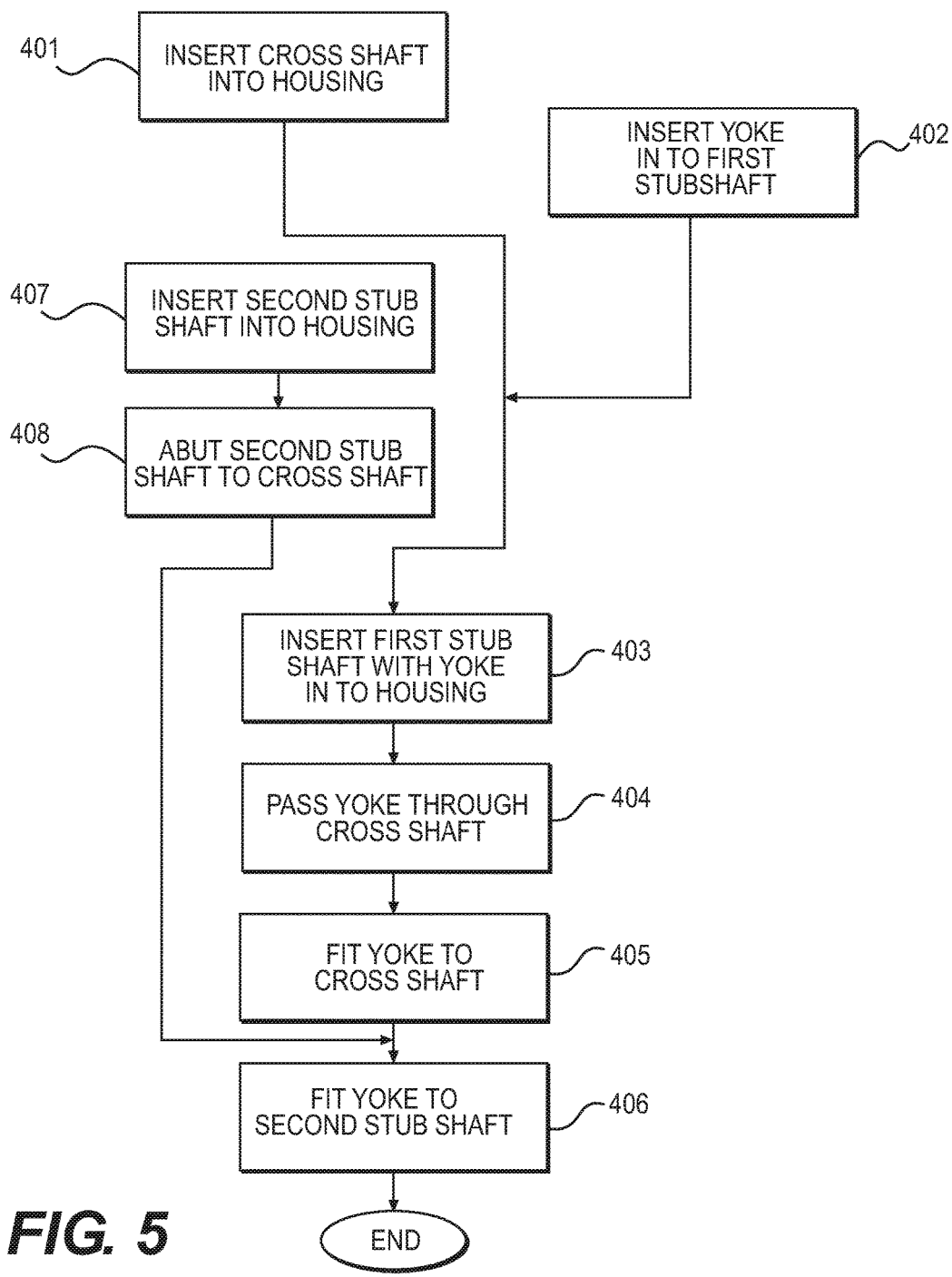
FIG. 5 is a flow diagram for a drop-in assembly method.

The yoke 40 facilitates a drop-in assembly process. One method is illustrated in FIG. 5.

One method of assembling the mounting assembly may comprise press fitting the yoke 40 to the first stub shaft 20, mounting the fitting 71 to the yoke 40, passing the fitting 71 on the yoke 40 through the openings 11 and 12 in the cross shaft 10, and sliding the second stub shaft 30 on to the fitting 71 and yoke 40. Tooling can couple to orientation notch 47 in the yoke 40 to orient the yoke during the assembly process.

A method for assembling the pinion housing may comprise placing the first, second, third, and fourth pinions 61, 62, 63 and 64 within the housing 50. The cross shaft 10 may be passed through central bores in pinions 61 and 64 and extend in to openings 51 and 52 in the housing. The yoke 40 can press fit via lip 41 to recess 21 of first stub shaft 20. An alternative or additional step may comprise placing fitting 70 in groove 42 and sliding the fitting 70 and groove 42 in to first stub shaft 20 until the fitting 70 snap fits with groove 22. Second fitting 71 is placed in the notch 43 of yoke 40.

The yoke 40 and first stub shaft 20 may then be inserted in to housing opening 53 so that the stub shaft extends from the housing opening 53 to the cross shaft 10. The flat end 23 of first stub shaft 20 may abut flat surface 15 of recess 13, and the yoke may extend through the openings 11 and 12 in the cross shaft so that the fitting 71 and notch 43 extends out of the cross shaft 10.

The second stub shaft 30 may be inserted in to housing opening 54 before or after the first stub shaft 20 is inserted. The second stub shaft is inserted to extend from the housing opening 54 to the cross shaft 10 so that flat end 33 abuts flat surface 16. The fitting 71 and notch 43 form a slip fitting with groove 32.

Yoke 40, cross shaft 10, first stub shaft 20, and second stub shaft 30 are hollow, which greatly reduces the weight of the assembled mounting system. In addition, the fittings in the mounting system eliminate the need for threaded fasteners, which reduces machining tolerances. The use of press and slip fittings simplifies assembly and also reduces machining tolerances. The pinion shafts can be held in place relative to one another without the use of retaining plates, bolts, or other housing-mounted means, which reduces the weight of the assembly and reduces manufacturing complexity. The disclosed mounting system also provides easy assembly within a one-piece pinion housing.

Other implementations will be apparent to those skilled in the art from consideration of the specification and practice of the examples disclosed herein. It is intended that the specification and examples be considered as exemplary only, with the true scope and spirit being indicated by the following claims.

What is claimed is:

1. A mounting system for a differential, comprising:
   a cross shaft comprising:
   a long axis;
   a passageway through the cross shaft perpendicular to the long axis, the passageway comprising a first hole and a second hole; and
   a recess comprising a planar wall proximal to the first hole;
   a first stub shaft comprising a long axis parallel to a central axis of the first hole, the first stub shaft comprising an internal first groove and a planar surface in contact with the planar wall;
   a second stub shaft comprising a long axis parallel to a central axis of the second hole;
   a yoke in the passageway comprising a first portion extending in to the first stub shaft and a second portion extending in to the second stub shaft, wherein the first portion comprises a first notch; and
   a first bang ring in the first notch of the yoke,
   wherein the first bang ring seats in the first groove.

2. The mounting system of claim 1, wherein the yoke comprises a second notch and the second stub shaft comprises a second groove, and wherein a second bang ring secures the second notch with the second groove.

3. The mounting system of claim 1, wherein the yoke comprises a lip and the first stub shaft comprises a recess, and the lip is press fit in the recess.

4. The mounting system of claim 1, wherein the first stub shaft press-fits to the recess.

5. The mounting system of claim 1, wherein the recess is a machined flat comprising a planar face, the planar wall, and second planar wall.

6. The mounting system of claim 5, wherein the first stub shaft comprises a second planar surface for abutting the second planar wall.

7. The mounting system of claim 6, wherein the first stub shaft is press-fit to the recess.

8. The mounting system of claim 1, wherein the cross shaft comprises a second recess proximal to the second hole, wherein the first recess comprises a planar face and the second recess comprises a second planar face, wherein the first stub shaft comprises a first planar end and the first planar end abuts the first planar face, and wherein the second stub shaft comprises a second planar end and the second planar end abuts the second planar face.

9. The mounting system of claim 8, wherein the second recess comprises at least one planar side wall and an exterior portion of the second stub shaft is planar and is configured to abut the at least one planar side wall of the second recess, and wherein the at least one planar side wall of the second recess prevents rotation of the second stub shaft in the second recess.

10. A differential assembly comprising:
   a housing, the housing comprising and substantially enclosing:
   a first, second, third, and fourth pinion gear;
   a cross shaft passing through the first and fourth pinion gears;
   a hollow first stub shaft passing through the second pinion gear;
   a hollow second stub shaft passing through the third pinion gear;

a yoke passing through portions of the cross shaft, the first stub shaft, and the second stub shaft; and a first fitting connecting the yoke within the first stub shaft and a second fitting connecting the yoke within the second stub shaft, wherein the yoke retains the cross shaft, the first stub shaft, and the second stub shaft within the housing.

11. The differential of claim 10, wherein the first fitting comprises one of a snap ring and a bang ring, wherein the yoke comprises a first notch and the first stub shaft comprises an internal groove, and wherein the first fitting secures the first notch with the groove.

12. The differential of claim 10, wherein the second fitting comprises one of a snap ring and a bang ring, wherein the yoke comprises a notch and the second stub shaft comprises a groove, and wherein the second fitting secures the notch with the groove.

13. The differential of claim 10, wherein the yoke further comprises a lip and the first stub shaft comprises a recess, and the lip is press fit in the recess.

14. The differential of claim 11, wherein the yoke further comprises a lip and the first stub shaft comprises a recess, and the lip is press fit in the recess.

15. The differential of claim 10, wherein:
the cross shaft comprises:
 a passageway through the cross shaft, the passageway comprising a first hole and a second hole; and
 a recess proximal to the first hole, the recess comprising:
  a planar face; and
  a planar wall forming an anti-rotation feature; and
the first stub shaft comprises a planar surface in contact with the planar wall.

16. The differential assembly of claim 15, wherein the first stub shaft press-fits to the recess.

17. The differential assembly of claim 15, wherein the recess is a machined flat comprising the planar face, the planar wall, and a second planar wall, and wherein the first stub shaft comprises a second planar surface for abutting the second planar wall.

18. A method for assembling pinion shafts in a differential housing comprising the steps of:
 inserting a cross shaft in to a first opening in the housing and extending the cross shaft through the housing to a second opening in the housing;
 inserting a yoke in to a first stub shaft;
 inserting a second stub shaft in to a third opening in the housing;
 extending the second stub shaft in to abutment with the cross shaft;
 inserting the first stub shaft in to a fourth opening in the housing;
 extending the first stub shaft in to abutment with the cross shaft to press-fit the first stub shaft to the cross shaft;
 passing the yoke through cross shaft openings; and
 slip-fitting the yoke to the second stub shaft.

19. The method of claim 18, further comprising the step of joining a lip on the yoke with a recess on the first stub shaft to form a press fit.

20. The method of claim 18, further comprising the step of joining a notch in the yoke with a groove in the second stub shaft using a bang ring.

21. The method of claim 18, further comprising the step of slip-fitting the yoke to the first stub shaft.

22. The method of claim 18, further comprising the step of press-fitting the second stub shaft to the cross-shaft.

* * * * *